US012140513B2

(12) United States Patent
Oikawa et al.

(10) Patent No.: US 12,140,513 B2
(45) Date of Patent: Nov. 12, 2024

(54) CONCENTRATOR, ANALYSIS SYSTEM INCLUDING SAME AND CONCENTRATING METHOD

(71) Applicant: SHIMADZU CORPORATION, Kyoto (JP)

(72) Inventors: Yukio Oikawa, Kyoto (JP); Shigeyoshi Horiike, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 277 days.

(21) Appl. No.: 17/962,723

(22) Filed: Oct. 10, 2022

(65) Prior Publication Data

US 2023/0204477 A1 Jun. 29, 2023

(30) Foreign Application Priority Data

Dec. 27, 2021 (JP) .................................. 2021-213204

(51) Int. Cl.
*G01N 1/40* (2006.01)
*G01N 30/02* (2006.01)
(Continued)

(52) U.S. Cl.
CPC ........... *G01N 1/4005* (2013.01); *G01N 30/74* (2013.01); *G01N 2030/027* (2013.01); *G01N 2030/328* (2013.01)

(58) Field of Classification Search
CPC ................ G01N 1/4005; G01N 30/74; G01N 2030/027; G01N 2030/328; G01N 30/08;
(Continued)

(56) References Cited

U.S. PATENT DOCUMENTS 4,579,662 A * 4/1986 Jonsson ................. B01D 61/18
 210/636
2009/0183871 A1* 7/2009 Salamitou ............ G01N 1/4005
 210/652

(Continued)

FOREIGN PATENT DOCUMENTS

JP 2012-503489 A 2/2012
JP 5548207 B2 7/2014

OTHER PUBLICATIONS

"Introduction to Tangential Flow Filtration for Laboratory and Process Development Applications" Scientific & Technical Report, PALL Laboratory(Apr. 2020).

(Continued)

*Primary Examiner* — Peter J Macchiarolo
*Assistant Examiner* — Anthony W Megna Fuentes
(74) *Attorney, Agent, or Firm* — Renner, Otto, Boisselle & Sklar, LLP (57) ABSTRACT

A concentrator includes a casing, a separation membrane that sections an inner space of the casing to form a flow path in the casing, a first supplier that supplies a first liquid from a first position of the casing to the flow path such that the first liquid flows along the separation membrane in a first direction, a second supplier that supplies a second liquid from a second position of the casing to the flow path such that the second liquid flows along the separation membrane in a second direction opposite to the first direction, and a third supplier that supplies a third liquid including a target (Continued)

component having a size that does not allow permeation of the target component through the separation membrane from a third position of the casing to the flow path.

10 Claims, 6 Drawing Sheets

(51) Int. Cl.
| | | |
|---|---|---|
| *G01N 30/32* | (2006.01) | |
| *G01N 30/74* | (2006.01) | |
| *B01D 61/00* | (2006.01) | |
| *C07K 1/16* | (2006.01) | |
| *C07K 1/34* | (2006.01) | |
| *C07K 1/36* | (2006.01) | |
| *C12M 1/00* | (2006.01) | |
| *C12M 1/26* | (2006.01) | |
| *C12M 1/36* | (2006.01) | |
| *G01N 30/08* | (2006.01) | |
| *G01N 30/14* | (2006.01) | |
| *G01N 30/26* | (2006.01) | |
| *G01N 30/84* | (2006.01) | |

(58) Field of Classification Search
CPC ........ G01N 30/14; G01N 30/26; G01N 30/84; B01D 61/00; C07K 1/16; C07K 1/34; C07K 1/36; C12M 23/00; C12M 33/14; C12M 41/48
See application file for complete search history.

(56) References Cited

U.S. PATENT DOCUMENTS

| | | |
|---|---|---|
| 2010/0098725 A1 | 4/2010 | Liu et al. |
| 2012/0219588 A1 | 8/2012 | Thompson et al. |
| 2012/0258136 A1 | 10/2012 | Liu et al. |
| 2019/0322975 A1* | 10/2019 | Nakai ................. C12M 29/04 |
| 2020/0399585 A1* | 12/2020 | Takahashi ............ C12N 1/02 |

OTHER PUBLICATIONS

"What is Tangential flow filtration?" Website: https://www.tblplastics.com/tangential-flow-filtration-tff/, Aug. 29, 2018.
"Tff system for manufacturing Biopharmaceutical drug" and its Machine Translation, Website: https://biotech.pall.jp/jp/ia/tangential-flow-filtration.html, date unknown, downloaded Jun. 11, 2021.

* cited by examiner

CONCENTRATOR, ANALYSIS SYSTEM INCLUDING SAME AND CONCENTRATING METHOD

BACKGROUND

Technical Field

The present invention relates to a concentrator, an analysis system including the concentrator and a concentrating method.

Description of Related Art

Tangential-flow-filtration (TFF) is sometimes used for purification of viruses, and concentration or desalting of proteins, peptides, nucleic acids or the like. For example, a method of generating viruses described in JP 5548207 B2 includes concentrating collected stabilized viruses using tangential-flow-filtration.

In a concentrator utilizing tangential-flow-filtration, a solution including a component to be concentrated (hereinafter referred to as a target component) flows along a separation membrane. The pore size of the separation membrane is smaller than the target component. Thus, components smaller than the [pores] pore size of the separation membrane are permeated through the separation membrane, and the target component is not permeated through the separation membrane. The solution including the target component is collected in a storage tank and flows again along the separation membrane. Thus, the solution including the target component circulates through a flow path including the separation membrane and the storage tank, so that the target component in the solution is concentrated.

SUMMARY

However, in the conventional concentrator utilizing tangential-flow-filtration, it is necessary to repeat the above-mentioned circulation of the solution in order to concentrate the target component in the solution. Thus, it takes a significant period of time. Further, the total amount of the solution including the target component is relatively large after the concentration. Thus, it is complicated to handle the solution including a certain amount of the target component. Therefore, it is desirable to collect a small amount of the solution including the certain amount of the target component.

An object of the present invention is to provide a concentrator, an analysis system including the concentrator and a concentrating method that enable concentration of a target component in a liquid in a short period of time and collection of a small amount of a liquid including a concentrated target component.

A concentrator according to one aspect of the present invention includes a casing, a separation membrane that sections an inner space of the casing to form a flow path in the casing, a first supplier that supplies a first liquid from a first position of the casing to the flow path such that the first liquid flows along the separation membrane in a first direction, a second supplier that supplies a second liquid from a second position of the casing to the flow path such that the second liquid flows along the separation membrane in a second direction opposite to the first direction, and a third supplier that supplies a third liquid including a target component having a size that does not allow permeation of the target component through the separation membrane from a third position of the casing to the flow path, wherein the third position is located between the first position and the second position in the first direction.

A concentrating method according to another aspect of the present invention includes supplying a first liquid from a first position of a casing to a flow path such that the first liquid flows along a separation membrane in a first direction in the flow path extending along the separation membrane in the casing, supplying a second liquid from a second position of the casing to the flow path such that the second liquid flows along the separation membrane in the casing in a second direction opposite to the first direction, and supplying a third liquid including a target component having a size that does not allow permeation of the target component through the separation membrane from a third position of the casing to the flow path, wherein the third position is located between the first position and the second position in the first direction.

Other features, elements, characteristics, and advantages of the present disclosure will become more apparent from the following description of preferred embodiments of the present disclosure with reference to the attached drawings.

DETAILED DESCRIPTION

A concentrator, an analysis system and a concentrating method according to embodiments will be described below in detail with reference to the drawings.

(1) Configuration of Analysis System

Figure 1:
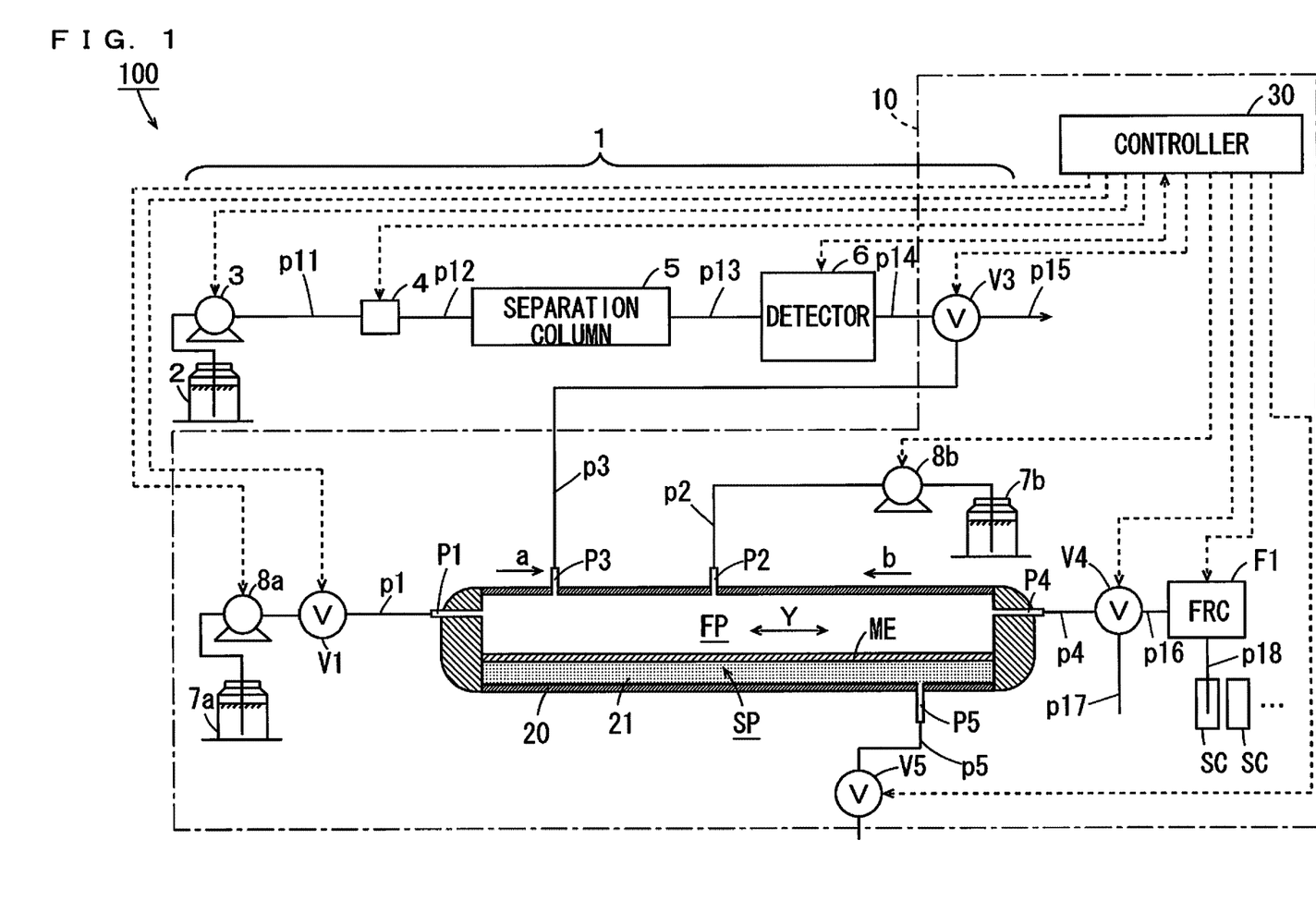
FIG. 1 is a schematic diagram showing the configuration of an analysis system including a concentrator according to one embodiment.

FIG. 1 is a schematic diagram showing the configuration of an analysis system including a concentrator according to one embodiment. The analysis system 100 includes a liquid chromatograph 1 and the concentrator 10. The liquid chromatograph 1 includes a pump 3, an autosampler 4, a separation column 5, a detector 6 and pipes p11 to p15.

In the present embodiment, the outlet port of the pump 3 is connected to the autosampler 4 through the pipe p11. The autosampler 4 is connected to the lead-in port of the separation column 5 through the pipe p12. The lead-out port of the separation column 5 is connected to the lead-in port of the detector 6 through the pipe p13.

A switching valve V3 is provided at the lead-out port of the detector 6. The switching valve V3 has one liquid inlet port, a first liquid outlet port and a second liquid outlet port.

The lead-out port of the detector 6 is connected to the liquid inlet port of the switching valve V3 through the pipe p14. The pipe p15 is connected to the first liquid outlet port of the switching valve V3. The state in which the liquid inlet port of the switching valve V3 is connected to the first liquid outlet port is referred to as a first state. The state in which the liquid inlet port of the switching valve V3 is connected to the second liquid outlet port is referred to as a second state.

An eluent container 2 contains an eluent which is a mobile phase. The pump 3 sucks an eluent from the eluent container 2 and guides the sucked eluent to the separation column 5 through the pipe p11, the autosampler 4 and the pipe p12.

The autosampler 4 introduces a sample to be analyzed into the eluent guided from the pump 3 to the separation column 5. Thus, the eluent including the sample is introduced into the separation column 5. The separation column 5 temporally separates the sample in the eluent into components. The eluent including the separated sample is introduced into the lead-in port of the detector 6 from the lead-out port of the separation column 5 through the pipe p13. The detector 6 detects the components into which the sample is separated. The detector 6 is a UV (ultraviolet) detector, for example. A chromatogram is generated based on a detection signal of the detector 6. Hereinafter, this operation is referred to as an analysis operation. Thereafter, the eluent including the sample led out from the detector 6 is guided to the switching valve V3 through the pipe p14. When the switching valve V3 is switched to the first state, the eluent guided to the switching valve V3 is guided to a liquid waste tank (not shown) or the like through the pipe p15.

In the present embodiment, the concentrator 10 is used to concentrate one or a plurality of components in the eluent led out from the detector 6 of the liquid chromatograph 1. The concentrator 10 includes a casing 20, a controller 30, pumps 8a, 8b, a fraction collector F1, a flow rate adjustment valve V1, switching valves V3, V4, an open-close valve V5 and pipes p1 to p5. The casing 20 is formed in a cylindrical shape having an inner space extending in one direction Y, and one end portion and the other end portion thereof are closed. The cross sectional shape of the casing 20 may be circular, oval, polygonal or another shape.

In the inner space of the casing 20, a separation membrane ME is provided parallel to the one direction Y so as to section the inner space into a flow path FP and a discharge space SP. In the present embodiment, an ultrafiltration membrane is used as the separation membrane ME. The ultrafiltration membrane has a pore size of about 0.001 μm to 0.01 μm. Here, a separation membrane having a pore size smaller than the size of a target component to be concentrated is used as the separation membrane ME. In the present embodiment, a porous sintered body 21 is provided in the discharge space SP to support the separation membrane ME. A mesh-structured sieve may be provided instead of the porous sintered body 21.

First to third supply ports P1 to P3, and first and second discharge ports P4, P5 are formed in the casing 20 of the concentrator 10. The first to third supply ports P1 to P3 and the first discharge port P4 are formed so as to communicate with the flow path FP in the casing 20 and the outside of the casing 20.

In the present embodiment, the first supply port P1 is provided at one end of the flow path FP of the casing 20, and the first discharge port P4 is provided at the other end of the flow path FP of the casing 20. In the present embodiment, the first supply port P1 and the first discharge port P4 are collinear.

Hereinafter, the direction directed from the first supply port P1 toward the first discharge port P4 is referred to as a first direction 'a,' and the direction directed from the first discharge port P4 toward the first supply port P1 is referred to as a second direction 'b.' The first direction 'a' and the second direction 'b' are opposite to each other. In the present embodiment, the first direction 'a' and the second direction 'b' are parallel to the one direction Y. The first supply port P1 and the first discharge port P4 do not have to be collinear, and the first direction 'a' and the second direction 'b' do not have to be collinear. That is, the first direction 'a' and the second direction 'b' may form another angle close to 180°.

The second supply port P2 is provided between the first supply port P1 and the first discharge port P4 in the one direction Y. Further, the third supply port P3 is provided between the first supply port P1 and the second supply port P2 in the one direction Y. In the present embodiment, the third supply port P3 is provided at a position closer to the first supply port P1 than the second supply port P2 in the one direction Y. The second discharge port P5 is formed so as to communicate with the discharge space SP in the casing 20 and the outside of the casing 20.

The first supply port P1 of the casing 20 is connected to the outlet port of the pump 8a through the pipe p1 and the flow rate adjustment valve V1. The pump 8a sucks an eluent contained in an eluent container 7a and guides the eluent to the first supply port P1 through the flow rate adjustment valve V1 and the pipe p1. Thus, the eluent is supplied from the first supply port P1 into the flow path FP of the casing 20, and the eluent supplied from the first supply port P1 flows in the first direction 'a' along the separation membrane ME. The flow rate adjustment valve V1 is configured to be capable of switching the flow rate of an eluent led out to the pipe p1 between a first flow rate and a second flow rate larger than the first flow rate. Hereinafter, the state in which the flow rate adjustment valve V1 leads out an eluent at the first flow rate to the pipe p1 is referred to as a first state, and the state in which the flow rate adjustment valve V1 leads out an eluent at the second flow rate to the pipe p1 is referred to as a second state.

The second supply port P2 of the casing 20 is connected to the outlet port of the pump 8b through the pipe p2. The pump 8b sucks an eluent contained in an eluent container 7b and guides the eluent to the second supply port P2 through the pipe p2. Thus, the eluent is supplied from the second supply port P2 into the flow path FP of the casing 20 and flows along the separation membrane ME in the second direction 'b' and also in the first direction 'a.' In the present embodiment, the eluent contained in the eluent containers 7a, 7b is the same as the eluent contained in the eluent container 2.

The third supply port P3 of the casing 20 is connected to the second liquid outlet port of the switching valve V3 through the pipe p3. When the switching valve V3 is switched to the second state, an eluent led out from the detector 6 is guided to the third supply port P3 of the casing 20 through the pipe p3. Thus, the eluent including a target component is supplied from the third supply port P3 toward the separation membrane ME in the flow path FP of the casing 20.

The switching valve V4 has one liquid inlet port, a first liquid outlet port and a second liquid outlet port. The first discharge port P4 of the casing 20 is connected to the liquid inlet port of the switching valve V4 through the pipe p4. The first liquid outlet port of the switching valve V4 is connected to the fraction collector (FRC) F1 through a pipe p16. An eluent in the flow path FP of the casing 20 is discharged from the first discharge port P4 to the liquid inlet port of the switching valve V4 through the pipe p4. When the switching valve V4 is switched to the first state, an eluent in the flow path FP of the casing 20 is guided to the fraction collector F1 through the pipe p16. When the switching valve V4 is switched to the second state, an eluent in the flow path FP of the casing 20 is guided to the liquid waste tank (not shown) or the like through a pipe p17.

One or a plurality of sample containers SC are arranged in the fraction collector F1. The fraction collector F1 collects a certain amount of an eluent including a target component guided from the flow path FP of the casing 20 in a sample container SC.

Out of a plurality of components in an eluent flowing along the separation membrane ME in the flow path FP of the casing 20, components having sizes smaller than the pore size of the separation membrane ME are permeated through the separation membrane ME together with the eluent. The eluent and components that have been permeated through the separation membrane ME from the flow path FP are guided to the discharge space SP of the casing 20. The second discharge port P5 of the casing 20 is connected to the open-close valve V5 through the pipe p5. When the open-close valve V5 is opened, the eluent in the discharge space SP is discharged to the liquid waste tank (not shown) or the like through the pipe p5.

The controller 30 controls the operations of the pump 3, the autosampler 4, the detector 6, the flow rate adjustment valve V1, the switching valves V3, V4, the open-close valve V5, the pumps 8a, 8b and the fraction collector F1 of the concentrator 10. In this manner, in the present embodiment, the controller 30 controls the constituent elements of the liquid chromatograph 1 and the concentrator 10. A controller for controlling the liquid chromatograph 1 and a controller for controlling the concentrator 10 may be separately provided.

The controller 30 includes a CPU (Central Processing Unit), a ROM (Read Only Memory), a RAM (Random Access Memory) and the like. In the ROM, an analysis program for performing an analysis operation using the liquid chromatograph 1, a concentrating program for performing a concentrating operation, described below, using the concentrator 10 and an elution time of a target component are stored in advance. The analysis operation and the concentrating operation are performed when the CPU executes the analysis program and the concentration program stored in the ROM on the RAM.

Figure 2:
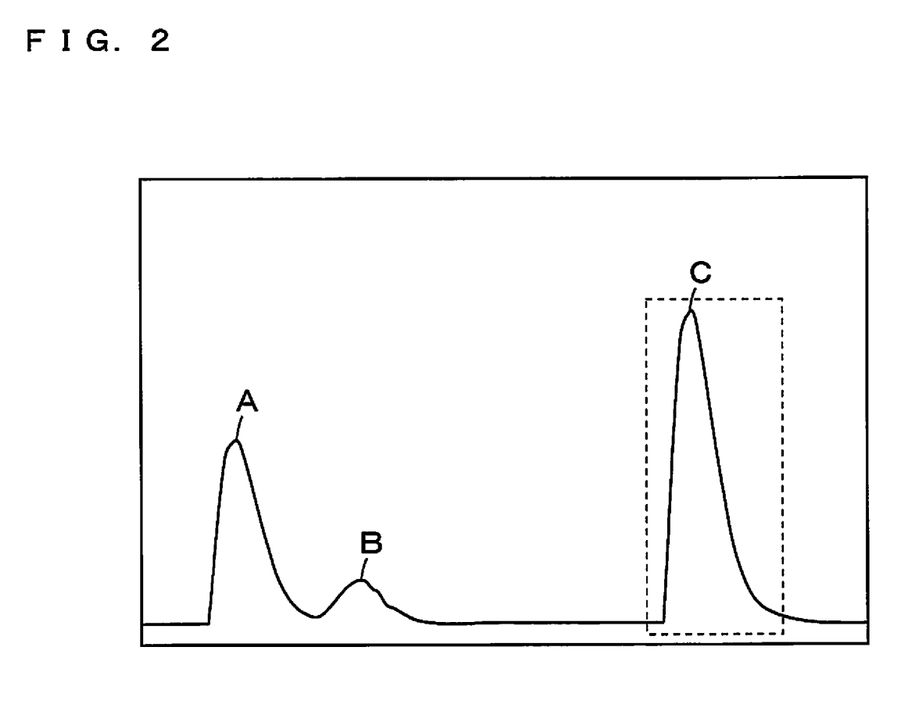
FIG. 2 is a diagram showing one example of a chromatogram generated based on an output signal of a detector of a liquid chromatograph.

FIG. 2 is a diagram showing one example of a chromatogram generated based on an output signal of the detector 6 of the liquid chromatograph 1. The abscissa of the chromatogram indicates an elution time (retention time), and the ordinate indicates a signal intensity. In the chromatogram shown in FIG. 2, a plurality of peaks A to C indicating a plurality of components in a sample temporally separated by the separation column 5 appear.

(2) Operation of Analysis System 100

The analysis system 100 according to the present embodiment performs the analysis operation using the liquid chromatograph 1 and performs the concentrating operation using the concentrator 10. The concentrating operation includes an accumulating operation and a collecting operation. The accumulating operation is an operation of accumulating a target component in an eluent at a predetermined location on the separation membrane ME. The collecting operation is an operation of discharging the target component accumulated by the accumulating operation from the casing 20 together with the eluent and collecting the target component in a sample container SC.

Figure 3:
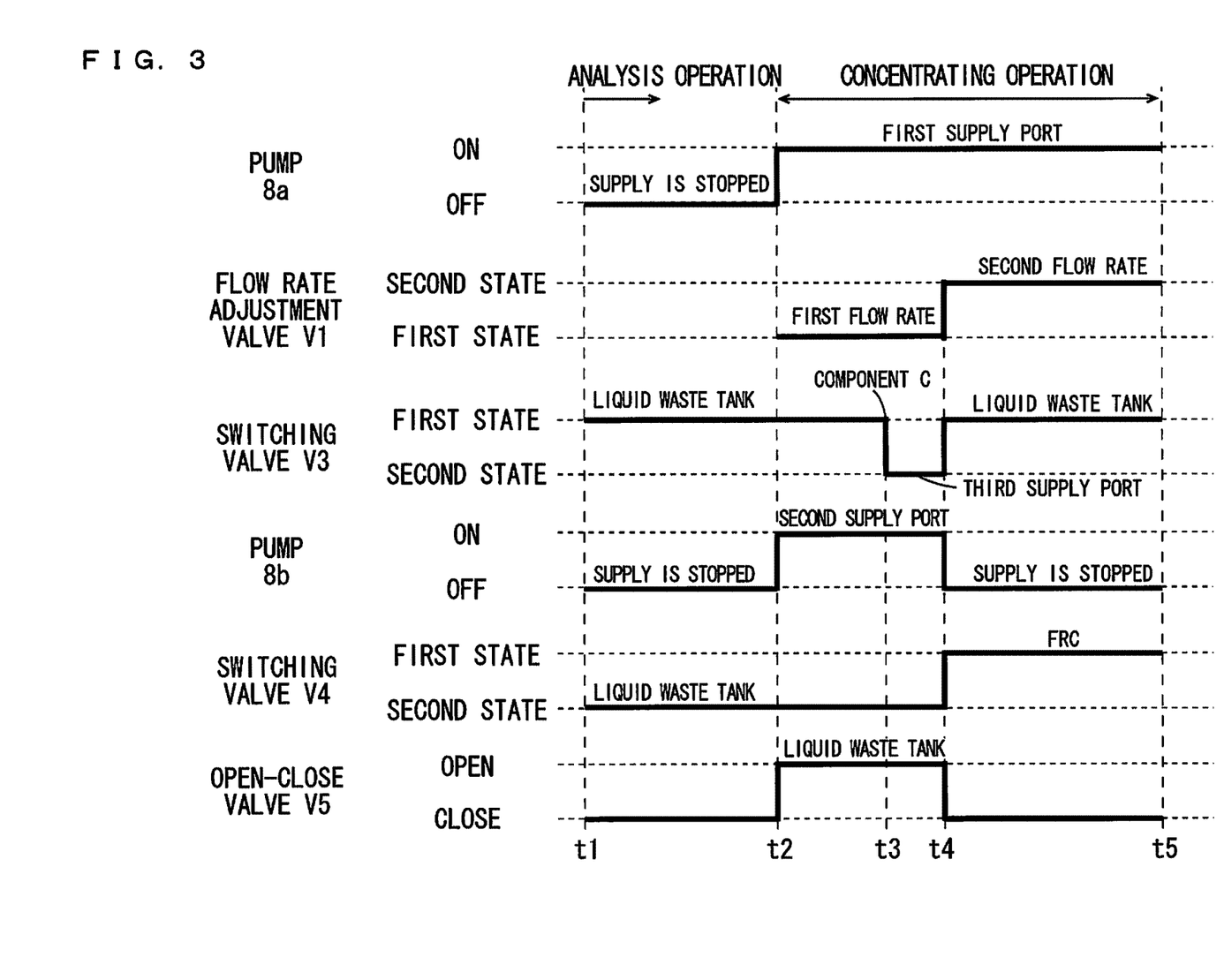
FIG. 3 is a timing chart showing the transition of state of each component in the analysis system of FIG. 1.
Figure 4:
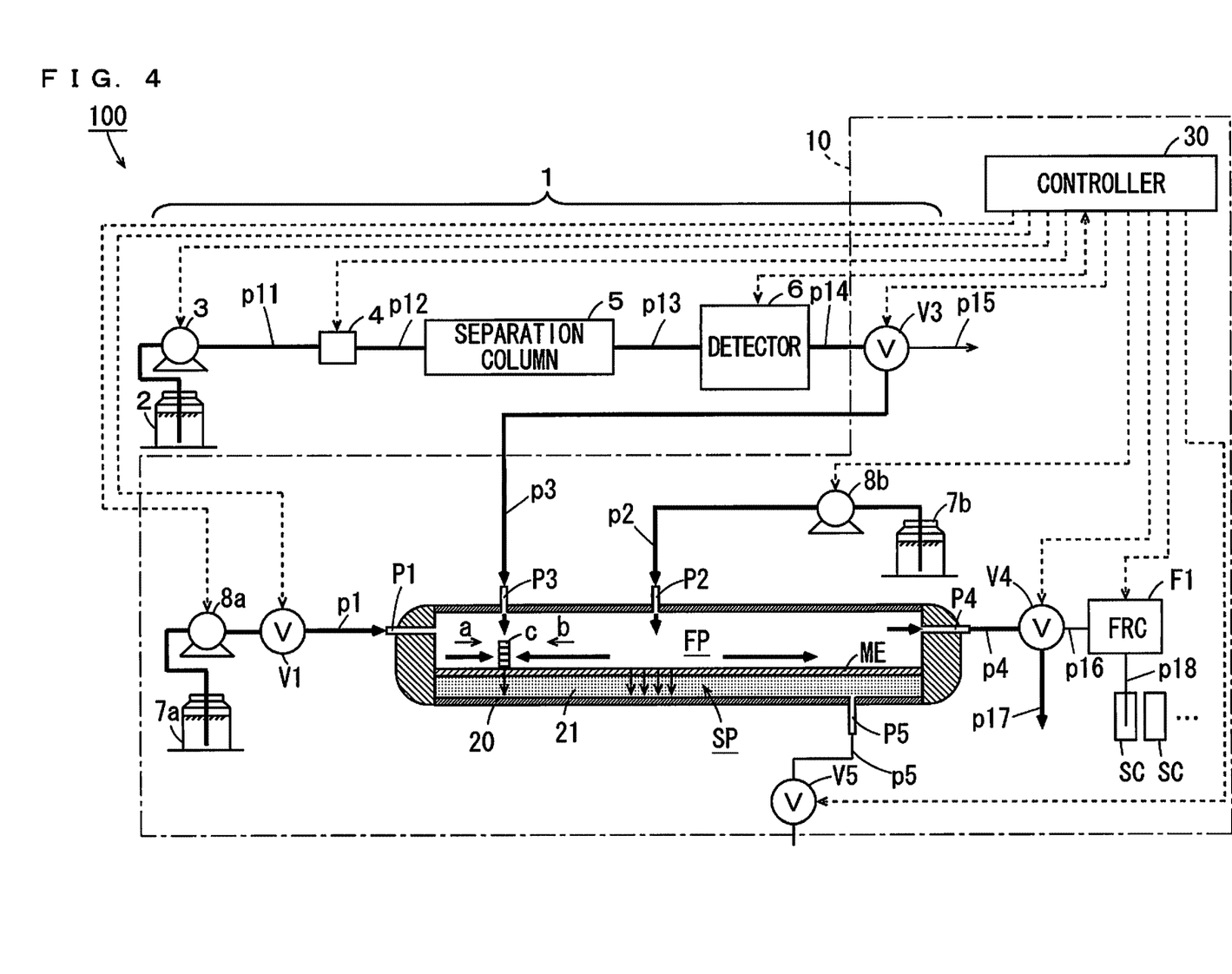
FIG. 4 is a schematic diagram showing an accumulating operation in a concentrating operation of the analysis system of FIG. 1.
Figure 5:
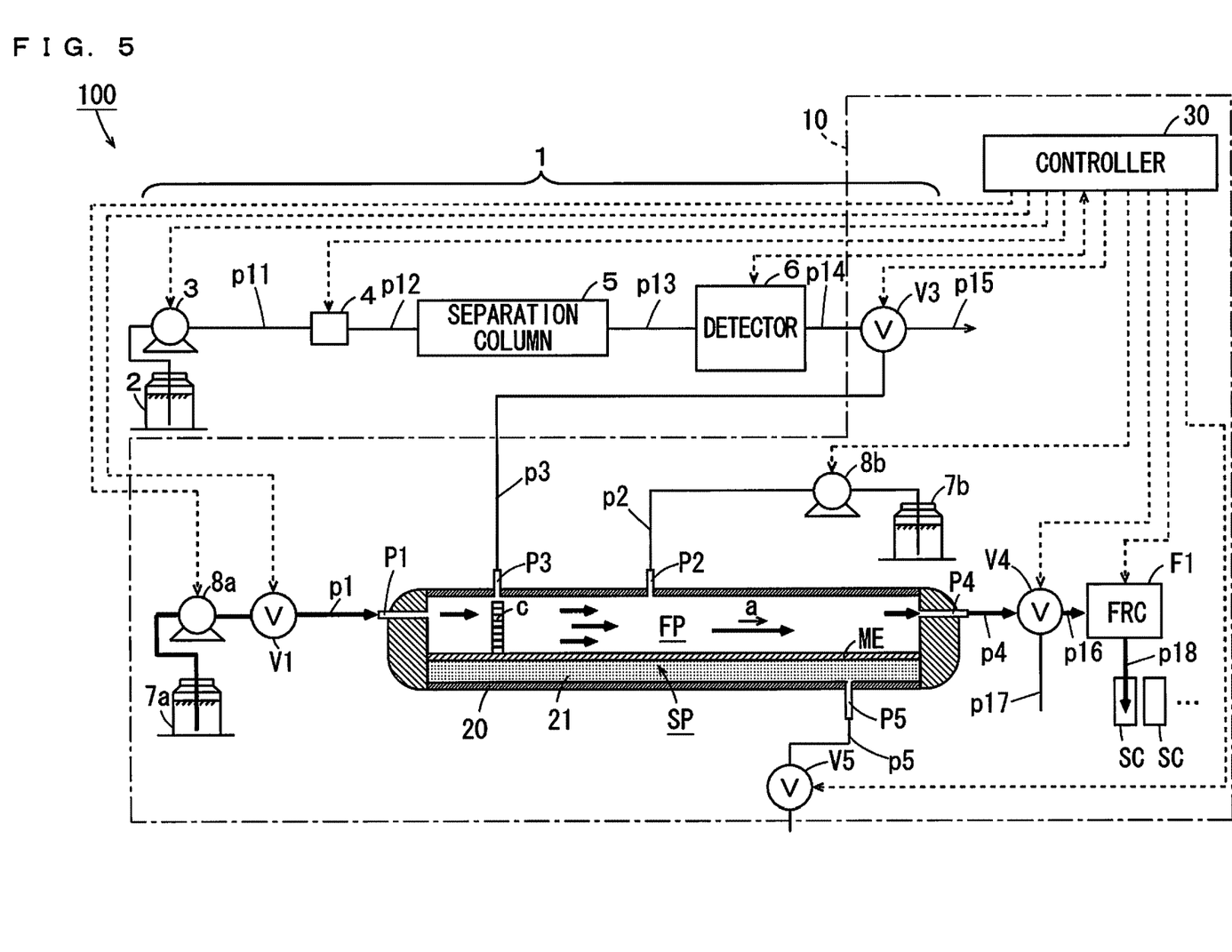
FIG. 5 is a schematic diagram showing a collecting operation in the concentrating operation of the analysis system of FIG. 1.

FIG. 3 is a timing chart showing the transition of the state of each element in the liquid chromatograph 1 of FIG. 1. FIG. 4 is a schematic diagram showing the accumulating operation in the concentrating operation of the analysis system 100. FIG. 5 is a schematic diagram showing the collecting operation in the concentrating operation of the analysis system 100. In FIGS. 4 and 5, a liquid flow is indicated by the thick lines. Here, the component corresponding to a peak C in the chromatogram of FIG. 2 is concentrated as a target component, by way of example.

FIG. 3 shows the temporal changes of the states of the flow rate adjustment valve V1, the switching valves V3, V4, the open-close valve V5 and the pumps 8a, 8b in the analysis operation and the concentrating operation. In the example of FIG. 3, the analysis operation is performed from a point t1 in time, and the concentrating operation is performed in the period from a point t2 to a point t5 in time. In the concentrating operation, the accumulating operation is performed in the period from a point t3 to a point t4 in time, and the collecting operation is performed in the period from the point t4 to the point t5 in time.

First, the controller 30 of FIG. 4 switches the switching valve V3 to the first state. Thus, an eluent discharged from the pump 3 is guided to the detector 6 through the pipe p12, the autosampler 4, the pipe p13 and the separation column 5. At this time, a sample is introduced into the eluent by the autosampler 4. Thus, the sample in the eluent are separated into components by the separation column 5. In this state, the separated components are detected by the detector 6. The controller 30 generates the chromatogram of FIG. 2, for example, based on an output signal of the detector 6. The eluent led out from the detector 6 is discharged to the liquid waste tank or the like through the switching valve V3 and the pipe p15. At the point t1 in time, the pumps 8a, 8b are turned off, the switching valve V4 is in the second state and the open-close valve V5 is closed.

Next, at a point t2 in time at which a predetermined period has passed since the point t1 in time, the controller 30 turns on the pump 8a and switches the flow rate adjustment valve V1 to the first state. Thus, an eluent in the eluent container 7a is supplied to the flow path FP in the casing 20 through the pump 8a, the pipe p1 and the first supply port P1 of the casing 20. The eluent supplied to the flow path FP through the first supply port P1 flows in the first direction 'a' along the separation membrane ME. Further, the controller 30 turns on the pump 8b. Thus, the eluent in the eluent container 7b is supplied into the flow path FP in the casing 20 through the pump 8b, the pipe p2 and the second supply port P2 of the casing 20. The eluent supplied from the second supply port P2 into the flow path FP flows in the first direction 'a' and the second direction 'b' along the separation membrane ME. In this case, the eluent flowing from the first supply port P1 in the first direction 'a' and the eluent flowing from the second supply port P2 in the second direction 'b' collide with each other between the first supply port P1 and the second supply port P2. Further, the controller 30 opens the open-close valve V5 to enable discharging from the discharge space SP in the casing 20.

The accumulating operation is started from the point t3 in time at which the component corresponding to the peak C of FIG. 2 (hereinafter referred to as a target component c) is detected by the detector 6. At the point t3 in time, the controller 30 switches the switching valve V3 to the second state. Thus, an eluent including the target component c led out from the detector 6 is supplied into the flow path FP in the casing 20 through the switching valve V3, the pipe p3 and the third supply port P3 of the casing 20.

The eluent including the target component c is supplied to the position at which the eluent that is supplied from the first supply port P1 and flows in the first direction 'a' and the eluent that is supplied from the second supply port P2 and flows in the second direction 'b' collide with each other.

In the example of FIG. 4, the third supply port P3 is arranged at a position closer to the first supply port P1 than the second supply port P2. In this case, the flow rate of the eluent in the pipe p2 is set larger than the flow rate of the eluent in the pipe p1 such that the eluent is supplied from the third supply port P3 to the collision position at which the eluent supplied from the first supply port P1 and the eluent supplied from the second supply port P2 collide.

In this manner, because the eluent including the target component c is supplied from the third supply port P3 to the collision position at which the eluent flowing in the first direction 'a' and the eluent flowing in the second direction 'b' collide, the target component c is accumulated on the separation membrane ME. Further, during accumulation of the target component c, part of the eluent flowing in the first direction 'a' and part of the eluent flowing in the second direction 'b' along the separation membrane ME are permeated through the separation membrane ME by tangential-flow-filtration. Further, components having sizes smaller than the pore size of the separation membrane ME in the eluent supplied from the third supply port P3 are permeated through the separation membrane ME. The eluent and components that have been permeated through the separation membrane ME are guided from the second discharge port P5 to the liquid waste tank (not shown) or the like through the pipe p5 and the open-close valve V5.

It is determined that accumulation of the target component c has ended when a predetermined period of time has elapsed from the point t3 in time at which the accumulating operation is started or when a signal intensity of the detector 6 is equal to or larger than a predetermined value. At the point t4 in time, the controller 30 switches the switching valve V3 to the first state. Thus, the supply of the eluent from the third supply port P3 into the flow path FP of the casing 20 is stopped. Further, the controller 30 turns off the pump 8b. Thus, the supply of the eluent from the second supply port P2 into the flow path FP of the casing 20 is stopped. Further, the controller 30 switches the switching valve V4 to the first state. Further, the controller 30 closes the open-close valve V5.

In this state, the controller 30 switches the flow rate adjustment valve V1 to the second state. Thus, the eluent is continuously supplied to the first supply port P1. In this case, an amount of the eluent supplied to the first supply port P1 during the collecting operation is larger than an amount of the eluent supplied to the first supply port P1 during the accumulating operation. Thus, a flow of the eluent in the first direction 'a' from the first supply port P1 toward the first discharge port P4 is formed in the flow path FP of the casing 20. As a result, the eluent in the flow path FP of the casing 20 and the target component c accumulated on the separation membrane ME are guided from the first discharge port P4 through the pipe p4, the switching valve V4 and the pipe p16 to the fraction collector F1. Here, the eluent including the target component c is collected in a sample container SC arranged in the fraction collector F1. The concentrating operation performed by the concentrator 10 ends at the point t5 in time when the eluent including the target component c is collected in the sample container SC.

(3) Inventive Example 1 and Comparative Example 1

In an inventive example 1, the collection rate of a target component in an accumulating operation of the concentrator 10 was evaluated. In the present inventive example 1, the flow rates of the first supply port P1, the second supply port P2, the third supply port P3, the first discharge port P4 and the second discharge port P5 of the concentrator 10 were controlled with use of a pump, a syringe, a switching valve, a mass flow meter and the like. An ultrafiltration membrane having a molecular weight cut-off of 10 kDa was used as the separation membrane ME. Further, a UV (ultraviolet) detector using ultraviolet rays of 280 nm was connected to the first discharge port P4. As the target component, BSA (bovine serum albumin) manufactured by Sigma Adrich was used. 1.0 mg of BSA was dissolved in 10 mL of ultrapure water, and a BSA solution having a concentration of 0.1 mg/mL was prepared.

In the accumulating operation, the BSA solution having a concentration of 0.1 mg/mL was injected into the flow path FP from the third supply port P3 with use of a 1 mL manual injector. The ultrapure water was supplied from the first supply port P1 and the second supply port P2 into the flow path FP. The flow rate of the first supply port P1 was set at 0.5 mL/min, and the flow rate of the second supply port P2 was set to 1.7 mL. Further, the flow rate of the first discharge port P4 was set to 1.2 mL/min, and the flow rate of the second discharge port P5 was set to 1.2 mL/min. Thus, the BSA solution was accumulated on the separation membrane ME for 2.5 minutes.

In a collecting operation, the flow rate of the first supply port P1 was set to 1.2 mL/min, and the flow rates of the second supply port P2 and the third supply port P3 were set to 0 mL/min. Further, the BSA accumulated on the separation membrane ME was discharged from the first discharge port P4 for about 1 minute. At this time, the flow rate of the second discharge port P5 was set to 0 mL/min, and the flow rate of tangential-flow-filtration was set to 0 mL/min. The BSA solution discharged from the first discharge port P4 was guided to a UV detector.

In a comparative example 1, an accumulating operation was not performed, a BSA solution having a concentration of 0.1 mg/mL was injected into the flow path FP from the third supply port P3 by the 1 mL manual injector, and the BSA solution discharged from the first discharge port P4 by a collecting operation was guided to the UV detector.

Figure 6:
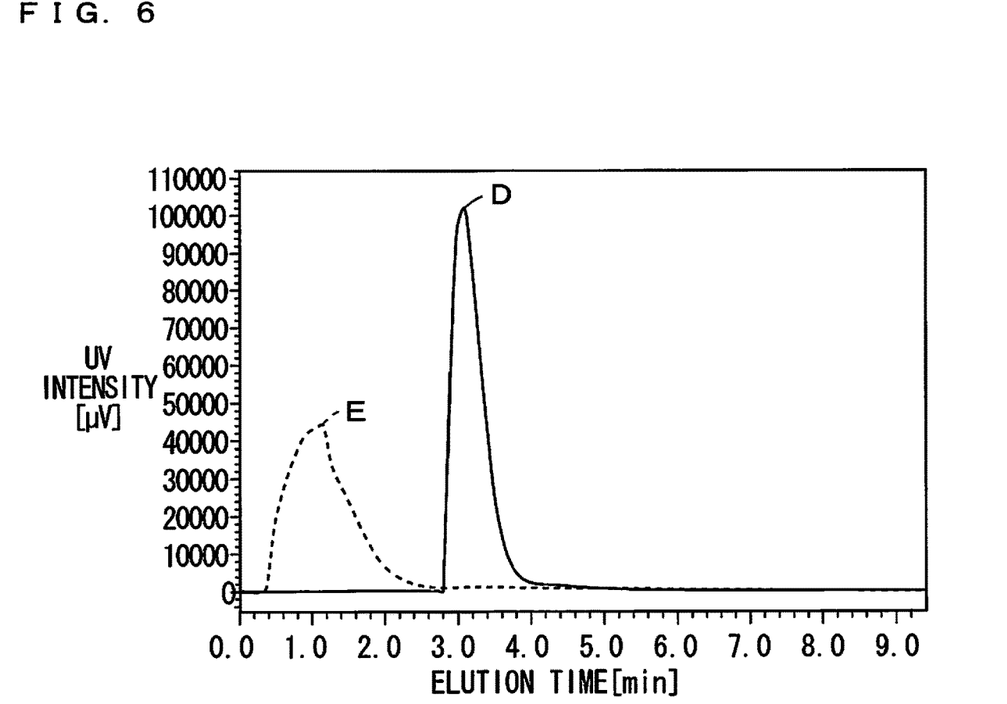
FIG. 6 is a diagram showing a chromatogram obtained in an inventive example 1 and a comparative example 1.

FIG. 6 is a diagram showing a chromatogram obtained by detection of the BSA solution collected after the accumulating operation is performed in the inventive example 1 and the BSA solution that is collected without the accumulating operation in the comparative example 1 by the UV detector. In the chromatogram of FIG. 6, a peak D of the BSA detected in the inventive example 1 is indicated by the solid line, and a peak E of the BSA detected in the comparative example 1 is indicated by the broken line. Here, an area value of the peak D was 2761087 [μV·sec]. An area value of the peak E was 2808307 [μV·sec]. It was confirmed that the collection rate of BSA in a case in which the accumulating operation was performed was 98.5%, which was substantially the same as that in a case in which the accumulating operation was not performed. Further, it was confirmed that the collection rate of a target component was high in a case in which the accumulating operation was performed in the concentrator 10 according to the present embodiment.

(4) Inventive Example 2

In an inventive example 2, two types of solutions including the same amount of a target component and having different concentrations were subjected to an accumulating operation with use of a concentrator 10 similar to that used in the inventive example 1, and the signal intensities of peaks of a chromatogram were compared.

In the inventive example 2, a total amount of 100 μL of a BSA solution having the concentration of 1.0 mg/ml (hereinafter referred to as a first BSA solution) and a total amount of 1 mL of a BSA solution (hereinafter referred to as a second BSA solution) having the concentration of 0.1 mg/ml were used. Each of the first BSA solution and the second BSA solutions includes 0.1 mg of BSA.

The first BSA solution was injected into the flow path FP from the third supply port P3, and the accumulating operation and the collecting operation were performed. A period of time during which the accumulating operation of accumulating the first BSA solution was performed was set to 1 minute. The second BSA solution was injected into the flow path FP from the third supply port P3, and the accumulating operation and the collecting operation were performed. A period of time during which the accumulating operation of accumulating the second BSA solution was performed was set to 2.5 minute. The other conditions for the accumulating operation and the collecting operation are the same as those in the inventive example 1.

Figure 7:
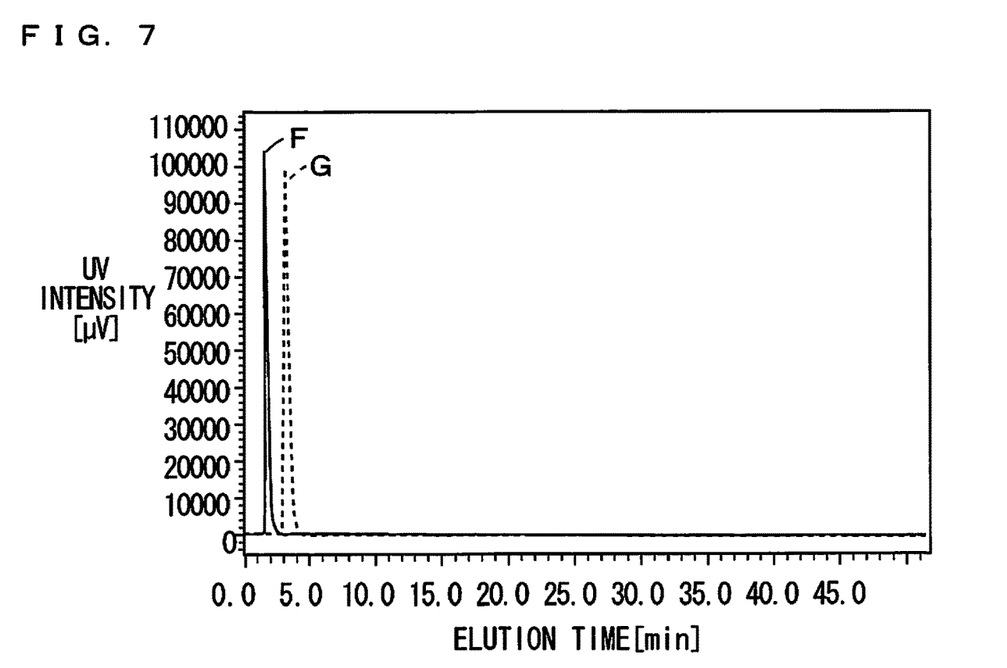
FIG. 7 is a diagram showing a chromatogram obtained in an inventive example 2.

FIG. 7 is a diagram showing a chromatogram obtained in an inventive example 2. In the chromatogram of FIG. 7, a peak F corresponding to BSA in a case in which the first BSA solution is used is indicated by the solid line, and a peak G corresponding to BSA in a case in which the second BSA solution is used is indicated by the broken line. The elution times of the peak F and the peak G are different since the accumulating operation is performed at different points in time. Here, in the chromatogram of FIG. 7, the height (signal intensity) of the peak F was 104146 [μV], and the height (signal intensity) of the peak G was 98920 [μV]. In this case, the height of the peak G was 95.0% of the height of the peak F. From this result, it was confirmed that, in a case in which the amounts of a target component included in solutions concentrated by the concentrator 10 were the same, even when the concentrations of the solutions were different, peaks having substantially the same height could be detected.

(5) Effects of Embodiments

With the concentrator 10 according to the present embodiment, the target component c in the eluent is accumulated at a position at which the eluent flowing in the first direction 'a' and the eluent flowing in the second direction 'b' collide with each other on the separation membrane ME. Further, during accumulation of the target component c, part of the eluents supplied from the first supply port P1 and the second supply port P2 flowing along the separation membrane ME are permeated through the separation membrane ME by tangential-flow-filtration. Further, a component having a size smaller than the pore size of the separation membrane ME of an eluent supplied from the third supply port P3 is permeated through the separation membrane ME. In this case, it is possible to increase the concentration of the target component c without circulating the eluent many times. Therefore, the target component c in the liquid can be concentrated in a short period of time, and a small amount of the eluent including the concentrated target component c can be collected. For example, in the concentrating operation, the target ingredient c can be concentrated in about 1 to 2 minutes. Further, in the collecting operation, 2 mL or less than 2 mL of an eluent including the target ingredient c can be collected.

Further, in the present embodiment, because the position at which the eluents collides with each other is set immediately below the third supply port P3, the target component c supplied from the third supply port P3 is accumulated without being dispersed in the first direction 'a' or the second direction 'b.' Therefore, the accumulating efficiency in regard to the target component c is improved.

Further, in the present embodiment, during the collecting operation, the eluent remaining on the separation membrane ME in the flow path FP is discharged from the first discharge port P4 together with the accumulated target component c. At this time, part of the eluent remaining on the separation membrane ME is permeated through the separation membrane ME by tangential-flow-filtration. Therefore, it is possible to increase an amount of the target component accumulated on the separation membrane ME and decrease an amount of the eluent discharged from the first discharge port P4.

Further, because the first discharge port P4 is provided at the other end of the casing 20, an amount of the eluent permeated through the separation membrane ME by tangential-flow-filtration is increased. Therefore, the concentrating efficiency in regard to the target component c is improved.

Further, in the present embodiment, the eluent and the target component c remaining in the flow path FP are discharged from the flow path FP by the eluent flowing in the first direction 'a' in the collecting operation. Therefore, the eluent including the concentrated target component c can be collected with simple control.

Further, with the analysis system 100 according to the present embodiment, a specific component in an eluent analyzed by the liquid chromatograph 1 is concentrated by the concentrator 10. Thus, the target component in a sample analyzed by the liquid chromatograph 1 can be concentrated in a short period of time, and a small amount of the eluent including the concentrated target component can be easily collected.

Further, the eluent including the target component in the sample is supplied to the third supply port P3. Thus, it is possible to concentrate a desired component in the sample analyzed by the liquid chromatograph 1 as the target component c. Therefore, it is possible to concentrate one or a plurality of desired components among components of the sample analyzed by the liquid chromatograph 1.

(6) Other Embodiments

While being included in the analysis system 100, the concentrator 10 may be used alone. In this case, the supply of a liquid to the first supply port P1, the second supply port P2, the first discharge port P4 and the second discharge port P5 of the concentrator 10 may be controlled with use of a pump, a syringe, a switching valve and a mass flow meter, for example. Further, the concentrator 10 according to the above-mentioned embodiment can be used for concentration or desalting of proteins, peptides, nucleic acids and the like, purification of viruses and so on.

While an eluent used in the liquid chromatograph 1 is used as a liquid to be supplied to the first and second supply ports P1, P2, another liquid such as separately prepared ultrapure water may be used. In this case, an eluent and a sample supplied from the third supply port P3 can be desalted. Further, it is possible to carry out a structural analysis in regard to the target component c by connecting a mass spectrometer or the like to the first discharge port P4.

(7) Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. In the above-mentioned embodiment, the flow rate adjustment valve V1, the pump 8a and the pipe p1 are examples of a first supplier, the pump 8b and the pipe p2 are examples of a second supplier, the switching valve V3 and the pipe p3 are examples of a third supplier, and the switching valve V4 and the pipe p4 are examples of a first discharger.

(8) Aspects

It will be appreciated by those skilled in the art that the exemplary embodiments described above are illustrative of the following aspects.

(Item 1) A concentrator according to one aspect includes a casing, a separation membrane that sections an inner space of the casing to form a flow path in the casing, a first supplier that supplies a first liquid from a first position of the casing to the flow path such that the first liquid flows along the separation membrane in a first direction, a second supplier that supplies a second liquid from a second position of the casing to the flow path such that the second liquid flows along the separation membrane in a second direction opposite to the first direction, and a third supplier that supplies a third liquid including a target component having a size that does not allow permeation of the target component through the separation membrane from a third position of the casing to the flow path, wherein the third position is located between the first position and the second position in the first direction.

With the concentrator according to one aspect, the first liquid flowing in the first direction and the second liquid flowing in the second direction along the separation membrane of the flow path collide with each other between the first position and the second position in the first direction. At this time, part of the first liquid and part of the second liquid are permeated through the separation membrane by tangential-flow-filtration. In this state, the target component in the third liquid supplied to the flow path from the third position between the first position and the second position is accumulated at a position at which the first liquid and the second liquid collide with each other. During accumulation of the target component, part of the first liquid and part of the second liquid flowing along the separation membrane are permeated through the separation membrane by tangential-flow-filtration. Further, a component having a size smaller than the pore size of the separation membrane in the third liquid is permeated through the separation membrane.

In this manner, the target component is accumulated on the separation membrane, and the components of the first, second and third liquids having sizes smaller than the pore size of the separation membrane are permeated through the separation membrane. Therefore, it is possible to increase the concentration of the target component without circulating the third liquid many times. As a result, the target component in the liquid can be concentrated in a short period of time, and a small amount of liquid including the concentrated target component can be collected.

(Item 2) The concentrator according to item 1, wherein the third position may be equivalent to a position at which a flow of the first liquid in the first direction and a flow of the second liquid in the second direction collide with each other.

With the concentrator according to item 2, the target component is supplied to the position at which the first liquid and the second liquid collide with each other. Thus, the target component is accumulated without being dispersed in the first or second direction in which the first or second liquids flow. Therefore, the accumulation efficiency in regard to the target component is improved.

(Item 3) The concentrator according to item 1 or 2 may further include a first discharger that discharges the first, second and third liquids from a fourth position of the flow path after supply of the second liquid by the second supplier and supply of third liquid by the third supplier are stopped.

With the concentrator according to item 3, the first, second and third liquids remaining on the separation membrane are discharged together with the accumulated target component by the first discharger. At this time, part of the first, second and third liquids remaining on the separation membrane is permeated through the separation membrane by tangential-flow-filtration. Therefore, it is possible to increase an amount of the target component accumulated on the separation membrane and decrease an amount of the first, second and third liquids discharged from the first discharger.

(Item 4) The concentrator according to item 3, wherein the fourth position is located at a position farther downstream than the second position in the first direction.

With the concentrator according to item 4, the first, second and third liquids are discharged from the fourth position provided at a further downstream position than the second position. In this case, because the first, second and third liquids flow in the first direction along the separation membrane to be discharged, an amount of the first, second, and third liquids permeated through the separation membrane by tangential-flow-filtration is increased. Therefore, the concentrating efficiency in regard to the target component is improved.

(Item 5) The concentrator according to any one of items 1 to 4 may further include a controller that controls the first supplier, the second supplier, the third supplier and the first discharger, wherein the controller may control the first supplier, the second supplier and the third supplier such that the first liquid flows in the first direction and the second liquid flows in the second direction in the flow path and the third liquid is supplied to the flow path during a first operation, and may control the first, second and third suppliers and the first discharger, such that the first liquid is supplied to the flow path to flow in the first direction and the first liquid is discharged from the flow path together with the second liquid and the third liquid remaining on the separation membrane with the second and third liquids not supplied to the flow path during a second operation after the first operation.

With the concentrator according to item 5, the target component is accumulated at the position at which the first liquid and the second liquid collide with each other during the first operation. Further, the first, second and third liquids and the target component remaining in the flow path are discharged from the flow path during the second operation. In this case, the liquid including the concentrated target component can be collected with simple control.

(Item 6) The concentrator according to item 5, wherein the first supplier may supply the first liquid to the flow path at a first flow rate, and the second supplier may supply the second liquid to the flow path at a second flow rate larger than the first flow rate, during the first operation, and the third position may be set closer to the first position than the second position in the first direction.

With the concentrator according to item 6, during the first operation, the first liquid flows in the first direction at the first flow rate, and the second liquid flows in the second direction at the second flow rate larger than the first flow rate. Thus, the first liquid and the second liquid collide with each other near the first position in the first direction. Thus, the target component is accumulated at a position closer to the first position than the second position. Thus, during the second operation, the first liquid flows from the first position in the first direction to be discharged from the fourth position, so that the distances by which the first, second and third liquids remaining on the separation membrane flow along the separation membrane are increased. Thus, the efficiency of tangential-flow-filtration is improved. As a result, the concentrating efficiency in regard to the target component is improved.

(Item 7) An analysis system may include a liquid chromatograph, and the concentrator according to any one of items 1 to 6 that concentrates a specific component in an eluent discharged after an analysis performed by the liquid chromatograph as the target component in the third liquid.

With the analysis system according to item 7, the specific component in the eluent analyzed by the liquid chromatograph is concentrated by the concentrator. Thus, the target component in the liquid can be concentrated in a short period of time, and a small amount of liquid including the concentrated target component can be collected.

(Item 8) The analysis system according to item 7, wherein the liquid chromatograph may include a separation column, a mobile phase supplier that supplies a mobile phase to the separation column, a sample introducer that introduces a sample to a mobile phase to be supplied to the separation column by the mobile phase supplier, and a detector that detects a component of the sample in a mobile phase led out from the separation column, and the third supplier may supply a mobile phase including a sample discharged from the detector to the flow path as the third liquid.

With the analysis system according to item 8, the mobile phase including the sample is used as the third liquid. Thus, it is possible to concentrate the component of the sample analyzed by the liquid chromatograph as a target component.

(Item 9) The analysis system according to item 7 or 8, wherein the third supplier may supply one or a plurality of components out of components of a sample discharged from the detector to the flow path as the target component together with the third liquid.

With the analysis system according to item 9, one or a plurality of components among components of the sample analyzed by the liquid chromatograph can be concentrated.

(Item 10) A concentrating method includes supplying a first liquid from a first position of a casing to a flow path such that the first liquid flows along a separation membrane in a first direction in the flow path extending along the separation membrane in the casing, supplying a second liquid from a second position of the casing to the flow path such that the second liquid flows along the separation membrane in the casing in a second direction opposite to the first direction, and supplying a third liquid including a target component having a size that does not allow permeation of the target component through the separation membrane from a third position of the casing to the flow path, wherein the third position is located between the first position and the second position in the first direction.

In the concentrating method according to item 10, the target component is accumulated on the separation membrane, and the components of the first, second and third liquids having sizes smaller than the pore size of the separation membrane are permeated through the separation membrane. Therefore, it is possible to increase the concentration of the target component without circulating the third liquid many times. As a result, the target component in the liquid can be concentrated in a short period of time, and a small amount of liquid including the concentrated target component can be collected.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

We claim:

1. A concentrator comprising:
a casing;
a separation membrane configured to section an inner space of the casing to form a flow path in the casing;
a first supplier configured to supply a first liquid from a first position of the casing to the flow path such that the first liquid flows along the separation membrane in a first direction;
a second supplier configured to supply a second liquid from a second position of the casing to the flow path such that the second liquid flows along the separation membrane in a second direction opposite to the first direction; and
a third supplier configured to supply a third liquid including a target component having a size that does not allow permeation of the target component through the separation membrane from a third position of the casing to the flow path, wherein
the third position is located between the first position and the second position in the first direction.

2. The concentrator according to claim 1, wherein the third position is equivalent to a position at which a flow of the first liquid in the first direction and a flow of the second liquid in the second direction collide with each other.

3. The concentrator according to claim 1, further comprising a first discharger configured to discharge the first, second and third liquids from a fourth position of the flow path after supply of the second liquid by the second supplier and supply of third liquid by the third supplier are stopped.

4. The concentrator according to claim 3, wherein the fourth position is located at a position farther downstream than the second position in the first direction.

5. The concentrator according to claim 3, further comprising a controller configured to control the first supplier, the second supplier, the third supplier and the first discharger, wherein
the controller is configured to:
control the first supplier, the second supplier and the third supplier such that the first liquid flows in the first direction and the second liquid flows in the second direction in the flow path and the third liquid is supplied to the flow path during a first operation, and
control the first, second and third suppliers and the first discharger, such that the first liquid is supplied to the flow path to flow in the first direction and the first liquid is discharged from the flow path together with the second liquid and the third liquid remaining on the separation membrane with the second and third liquids not supplied to the flow path during a second operation after the first operation.

6. The concentrator according to claim 5, wherein the first supplier is configured to supply the first liquid to the flow path at a first flow rate, and the second supplier is configured to supply the second liquid to the flow path at a second flow rate larger than the first flow rate, during the first operation, and
the third position is set closer to the first position than the second position in the first direction.

7. An analysis system comprising:
a liquid chromatograph; and
the concentrator according to claim 1 that is configured to concentrate a specific component in an eluent discharged after an analysis performed by the liquid chromatograph as the target component in the third liquid.

8. The analysis system according to claim 7, wherein the liquid chromatograph includes
a separation column,
a mobile phase supplier configured to supply a mobile phase to the separation column,
a sample introducer configured to introduce a sample to a mobile phase to be supplied to the separation column by the mobile phase supplier, and
a detector configured to detect a component of the sample in a mobile phase led out from the separation column, and
the third supplier configured to supply a mobile phase including a sample discharged from the detector to the flow path as the third liquid.

9. The analysis system according to claim 8, wherein the third supplier is configured to supply one or a plurality of components out of components of a sample discharged from the detector to the flow path as the target component together with the third liquid.

10. A concentrating method including:
supplying a first liquid from a first position of a casing to a flow path such that the first liquid flows along a separation membrane in a first direction in the flow path extending along the separation membrane in the casing;
supplying a second liquid from a second position of the casing to the flow path such that the second liquid flows along the separation membrane in the casing in a second direction opposite to the first direction; and
supplying a third liquid including a target component having a size that does not allow permeation of the target component through the separation membrane from a third position of the casing to the flow path, wherein
the third position is located between the first position and the second position in the first direction.

* * * * *